United States Patent [19]

Rubingh et al.

[11] Patent Number: 4,659,802

[45] Date of Patent: Apr. 21, 1987

[54] CATIONIC COMPOUNDS HAVING CLAY SOIL REMOVAL/ANTI-REDEPOSITION PROPERTIES USEFUL IN DETERGENT COMPOSITIONS

[75] Inventors: Donn N. Rubingh; Eugene P. Gosselink, both of Cincinnati, Ohio

[73] Assignee: The Procter & Gamble Company, Cincinnati, Ohio

[21] Appl. No.: 553,551

[22] Filed: Nov. 22, 1983

Related U.S. Application Data

[63] Continuation-in-part of Ser. No. 452,649, Dec. 23, 1982, abandoned.

[51] Int. Cl.$^4$ ............................................. C08G 65/26
[52] U.S. Cl. .................................. 528/405; 252/547; 544/162; 544/168; 560/158; 560/159; 560/165; 560/170; 560/196; 564/59; 564/153; 564/294
[58] Field of Search ................ 528/405, 408; 544/162, 544/168; 560/158, 159, 165, 196, 170; 260/463; 564/59, 153, 294

[56] References Cited

U.S. PATENT DOCUMENTS

| | | |
|---|---|---|
| 2,272,489 | 2/1942 | Ulrich . |
| 2,296,225 | 9/1942 | Ulrich . |
| 2,701,239 | 2/1955 | Ryznar . |
| 2,778,814 | 1/1957 | Behrens et al. . |
| 2,792,369 | 5/1957 | Dickson . |
| 2,792,370 | 5/1957 | Dickson . |
| 2,792,371 | 5/1957 | Dickson . |
| 2,792,372 | 5/1957 | Dickson . |
| 2,979,528 | 4/1961 | Lundsted . |
| 3,040,076 | 6/1962 | Seidel et al. . |
| 3,113,113 | 12/1963 | Marsh et al. . |
| 3,154,489 | 10/1964 | Du Brow et al. . |
| 3,178,366 | 4/1965 | Du Brow et al. . |
| 3,200,106 | 8/1965 | Dickson et al. . |
| 3,200,155 | 8/1965 | Kirkpatrick et al. . |
| 3,236,671 | 2/1966 | Dybalski et al. . |
| 3,294,695 | 12/1966 | Tippett . |
| 3,301,783 | 1/1967 | Dickson et al. . |
| 3,336,231 | 8/1967 | Marsh et al. . |
| 3,398,197 | 8/1968 | Miller et al. . |
| 3,418,374 | 12/1968 | Miller et al. . |
| 3,444,200 | 5/1969 | Miller et al. . |
| 3,473,919 | 10/1969 | Metcalfe et al. . |
| 3,489,686 | 1/1970 | Parran . |
| 3,492,352 | 1/1970 | Miller et al. . |
| 3,510,521 | 5/1970 | Miller et al. . |
| 3,513,183 | 5/1970 | Morehouse . |
| 3,523,088 | 8/1970 | Dean et al. . |
| 3,531,417 | 9/1970 | Morehouse . |
| 3,531,507 | 9/1970 | Morehouse . |
| 3,549,542 | 12/1970 | Holderby . |
| 3,549,546 | 12/1970 | Moore . |
| 3,573,091 | 3/1971 | Waldman et al. . |
| 3,580,853 | 5/1971 | Parran . |
| 3,597,416 | 8/1971 | Diehl . |
| 3,622,518 | 11/1971 | Atherton et al. . |
| 3,650,962 | 3/1972 | Werdehausen et al. . |
| 3,650,963 | 3/1972 | Werdehausen et al. . |
| 3,663,444 | 5/1972 | Schmadel . |
| 3,671,305 | 6/1972 | Brown et al. . |
| 3,671,502 | 6/1972 | Samour et al. . |
| 3,684,427 | 8/1972 | Walz et al. . |
| 3,686,128 | 8/1972 | Werdehausen et al. . |
| 3,689,532 | 9/1972 | Emmons et al. . |
| 3,694,364 | 9/1972 | Edwards . |
| 3,719,647 | 3/1973 | Hardy et al. . |
| 3,737,385 | 5/1973 | Werdehausen et al. . |
| 3,769,398 | 10/1973 | Hewitt . |
| 3,833,378 | 9/1974 | Hayashi et al. . |
| 3,838,057 | 9/1974 | Barnes et al. . |
| 3,839,393 | 10/1974 | Steckler . |
| 3,864,317 | 2/1975 | Agata et al. . |
| 3,875,202 | 4/1975 | Steckler . |
| 3,901,715 | 8/1975 | Callahan et al. . |
| 3,925,262 | 12/1975 | Laughlin et al. . |
| 3,929,678 | 12/1975 | Laughlin et al. . |
| 3,936,503 | 2/1976 | Miller et al. . |
| 3,959,230 | 5/1976 | Hays . |
| 3,962,152 | 6/1976 | Nicol et al. . |

(List continued on next page.)

FOREIGN PATENT DOCUMENTS

| | | |
|---|---|---|
| 2085 | 5/1979 | European Pat. Off. . |
| 43622 | 1/1982 | European Pat. Off. . |
| 1298077 | 6/1969 | Fed. Rep. of Germany . |
| 1933511 | 1/1971 | Fed. Rep. of Germany . |
| 1955429 | 5/1971 | Fed. Rep. of Germany . |
| 2758122 | 7/1972 | Fed. Rep. of Germany . |
| 2165900 | 7/1973 | Fed. Rep. of Germany . |
| 2165586 | 7/1973 | Fed. Rep. of Germany . |
| 2221366 | 11/1973 | Fed. Rep. of Germany . |
| 2502357 | 8/1975 | Fed. Rep. of Germany . |
| 2843645 | 4/1980 | Fed. Rep. of Germany . |
| 3017198 | 11/1981 | Fed. Rep. of Germany . |
| 3136298 | 3/1983 | Fed. Rep. of Germany . |
| 46-20060 | 6/1971 | Japan . |
| 57-108133 | 7/1982 | Japan . |
| 57-108132 | 7/1982 | Japan . |
| 465200 | 4/1937 | United Kingdom . |
| 718010 | 2/1953 | United Kingdom . |
| 795771 | 5/1958 | United Kingdom . |
| 825676 | 12/1959 | United Kingdom . |
| 1111708 | 5/1968 | United Kingdom . |
| 1296352 | 11/1972 | United Kingdom . |
| 1524966 | 9/1978 | United Kingdom . |
| 1563599 | 3/1980 | United Kingdom . |
| 2070040 | 9/1981 | United Kingdom . |
| 562568 | 7/1977 | U.S.S.R. . |

OTHER PUBLICATIONS

Ethyleneamines from Union Carbide, p. 22, Nov., 1979.

*Primary Examiner*—Earl Nielsen
*Attorney, Agent, or Firm*—Eric W. Guttag; Steven J. Goldstein; Jerry J. Yetter

[57] ABSTRACT

Water-soluble cationic compounds having clay soil removal/anti-redeposition properties. The cationic compounds are selected from ethoxylated cationic diamines, ethoxylated cationic polyamines, ethoxylated cationic polymers and mixtures thereof. These cationic compounds are useful in detergent compositions.

12 Claims, No Drawings

U.S. PATENT DOCUMENTS

| Number | Date | Name | Ref |
|---|---|---|---|
| 3,997,580 | 12/1975 | Morehouse | |
| 4,000,091 | 12/1976 | Wentler | |
| 4,000,092 | 12/1976 | Wentler | |
| 4,003,870 | 1/1972 | Gibson et al. | |
| 4,071,428 | 1/1978 | Bosso et al. | 204/181 |
| 4,076,497 | 2/1978 | Freyberg et al. | 8/551 X |
| 4,101,690 | 7/1978 | Miyamoto et al. | |
| 4,110,176 | 8/1978 | Creutz et al. | 204/52 |
| 4,116,885 | 9/1978 | Derstadt et al. | |
| 4,118,324 | 10/1978 | Steckelberg et al. | 252/8.9 |
| 4,125,677 | 11/1978 | Graetz et al. | |
| 4,132,657 | 1/1979 | Verdiccio et al. | 252/32.5 |
| 4,132,680 | 1/1979 | Nichol et al. | |
| 4,134,970 | 1/1979 | Panka et al. | 424/70 |
| 4,138,371 | 2/1979 | Verdiccio et al. | 252/545 |
| 4,151,149 | 4/1979 | Smith | |
| 4,152,272 | 5/1979 | Young | |
| 4,159,277 | 6/1979 | Gosselink et al. | |
| 4,165,334 | 8/1979 | Gosselink et al. | |
| 4,171,278 | 10/1979 | Andree et al. | |
| 4,179,382 | 12/1979 | Rudkin et al. | |
| 4,200,563 | 4/1980 | Komiya | |
| 4,228,044 | 10/1980 | Cambre | |
| 4,240,450 | 12/1980 | Grollier et al. | |
| 4,246,387 | 1/1981 | Deutsch | |
| 4,301,044 | 11/1981 | Wentler et al. | |
| 4,305,718 | 12/1981 | Löffler et al. | |
| 4,313,895 | 2/1982 | Richmond et al. | |
| 4,372,882 | 2/1983 | Koster et al. | |

CATIONIC COMPOUNDS HAVING CLAY SOIL REMOVAL/ANTI-REDEPOSITION PROPERTIES USEFUL IN DETERGENT COMPOSITIONS

CROSS-REFERENCE TO RELATED APPLICATIONS

This application is a continuation-in-part of U.S. application Ser. No. 452,649, filed Dec. 23, 1982 now abandoned.

TECHNICAL FIELD

The present application relates to cationic compounds having clay-soil removal and anti-redeposition properties when used in detergent compositions.

A particularly important property of a detergent composition is its ability to remove particulate type soils from a variety of fabrics during laundering. Perhaps the most important particulate soils are the clay-type soils. Clay soil particles generally comprise negatively charged layers of aluminosilicates and positively charged cations (e.g. calcium) which are positioned between and hold together the negatively charged layers.

A variety of models can be proposed for compounds which would have clay soil removal properties. One model requires that the compound have two distinct characteristics. The first is the ability of the compound to adsorb onto the negatively charged layers of the clay particle. The second is the ability of the compound, once adsorbed, to push apart (swell) the negatively charged layers so that the clay particle loses its cohesive force and can be removed in the wash water.

One class of clay-soil removal compounds which appears to work according to this model are the polyethoxy zwitterionic surfactants disclosed in U.S. Pat. No. 4,301,044 to Wentler et al., issued Nov. 17, 1981. Representative of such compounds are those having the formula:

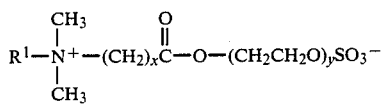

wherein $R^1$ is a $C_{14}$–$C_{20}$ alkyl group, x is 1 or an integer of from 3 to 5, and y is from 6 to 12. See also U.S. Pat. No. 3,929,678 to Laughlin et al., issued Dec. 30, 1975 (detergent composition containing polyethoxy zwitterionic surfactant plus other detergent surfactants); U.S. Pat. No. 3,925,262 to Laughling et al., issued Dec. 9, 1975 (detergent composition containing polyethoxy zwitterionic surfactants with detergent builders); U.S. Pat. No. 4,157,277 to Gosselink et al., issued June 26, 1979 ($C_4$ polyoxyalkylene zwitterionic surfactants useful in detergent compositions); U.S. Pat. No. 4,165,334 to Gosselink et al., issued Aug. 21, 1979 (sulfonium-type polyethoxy zwitterionic surfactants).

These polyethoxy zwitterionic surfactants are generally compatible with other detergent surfactants such as the nonionic, zwitterionic and ampholytic types. However, as suggested in the Wentler et al. patent, most anionic surfactants interfere with the particulate soil removal performance of these compounds; anionic soils such as fatty acids likewise interfere. Because anionic detergent surfactants form the most important class of such materials for use in detergent compositions, the lack of compatibility between these polyethoxy zwitterionic surfactants and anionic surfactants poses a significant handicap where particulate (clay) soil removal is desired.

In addition to clay soil removal, one of the other properties mentioned in the Laughlin et al. patents with regard to these polyethoxy zwitterionic surfactants is the ability to keep the removed soil in suspension during the laundering cycle. Soil which is removed from the fabric and suspended in the wash water can redeposit onto the surface of the fabric. This redeposited soil causes a dulling or "graying" effect which is especially noticeable on white fabrics. Because soil is normally hydrophobic, this graying effect is a particularly important problem for those fabrics made in total or in part from hydrophobic fibers, e.g. polyester.

To minimize this problem, anti-redeposition or whiteness maintenance agents can be included in the detergent composition. Besides the previously mentioned polyethoxy zwitterionic surfactants, there are a variety of other compounds which can be used as anti-redeposition agents. One class of agents are the water-soluble copolymers of acrylic or methacrylic acid with acrylic or methacrylic acid-ethylene oxide condensates disclosed in U.S. Pat. No. 3,719,647 to Hardy et al., issued Mar. 6, 1973. Another class of anti-redeposition agents are the cellulose and carboxymethylcellulose derivatives disclosed in U.S. Pat. No. 3,597,416 to Diehl, issued Aug. 3, 1971 (ionic combination of dodecyltrimethyl phosphonium chloride and sodium carboxymethylcellulose), and U.S. Pat. No. 3,523,088 to Dean et al., issued Aug. 4, 1970 (combination of alkali metal carboxymethylcellulose and hydroxypropylcellulose).

A mixture of compounds has also been used to provide not only anti-redeposition, but also clay soil removal properties. See U.S. Pat. No. 4,228,044 to Cambre, issued Oct. 14, 1980, which discloses detergent compositions having anti-redeposition and clay soil removal properties which can comprise a nonionic alkyl polyethoxy surfactant, a polyethoxy alkyl quaternary cationic surfactant and a fatty amide surfactant.

These anti-redeposition agents do have a number of significant handicaps. While effective to keep soil suspended, these compounds may lack additional clay soil removal properties. Moreover, as disclosed in the Diehl and Dean et al. patents, mixtures of compounds can be required to achieve the anti-redeposition benefit. To the extent that there are combined anti-redeposition/clay soil removal benefits as disclosed in the Cambre patent, mixtures of compounds are also required.

It is therefore an object of the present invention to provide compounds useful in detergent compositions which provide particulate soil, especially clay soil, removal benefits.

It is a further object of the present invention to provide compounds useful in detergent compositions which provide clay soil removal benefits and are anionic detergent surfactant compatible.

It is yet another object of the present invention to provide compounds useful in detergent compositions having anti-redeposition properties.

It is yet a further object of the present invention to provide compounds useful in detergent compositions which combine both clay soil removal and anti-redeposition properties.

These and further objects of the present invention are hereinafter disclosed.

BACKGROUND ART

U.S. Pat. No. 3,838,057 to Barnes et al., issued Sept. 24, 1974, discloses toilet bars containing ethoxylated quaternary ammonium compounds, including ethoxylated, quanternized polyethyleneimines (PEIs) taught to be useful in the detergent, textile, and polymer industries, as anti-static and softening agents. These ethoxylated quaternized PEIs have the formula:

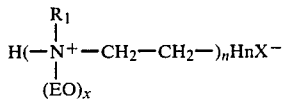

wherein $R_1$ is a compatible quaternary nitrogen substituent; n is at least 2; x is from 3 to 40; and $X^-$ is a compatible anion. Preferred compounds are those where $R_1$ is a $C_8$–$C_{22}$ alkyl group or the group:

where $R'$ is a $C_8$–$C_{22}$ alkyl group and y is from 3 to 40. See also U.S. Pat. No. 4,179,382 to Rudkin et al., issued Dec. 18, 1979; U.S. Pat. No. 4,152,272 to Young, issued May 1, 1979; and European Application 2,085 to Rudkin et al., published May 30, 1979, which disclose ethoxylated quaternized polyamines having $C_{10}$ to $C_{24}$ alkyl or alkenyl groups attached to one of the nitrogen atoms useful as fabric softeners.

U.S. Pat. No. 3,671,305 to Brown et al. issued June 20, 1972, discloses zwitterionic monomers which form polymers used to treat films, sheets, and filamentary materials so as to give them a durable, hydrophilic, anti-static, anti-soiling, soil releasing finish. These monomers have the formula:

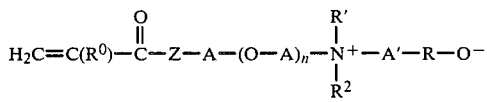

wherein n is 0 to 10; $R^0$ is hydrogen or methyl; Z is oxygen or —NH—; A can be a $C_2$–$C_3$ alkylene group (e.g. ethylene) when n is 1–10; $R'$ and $R^2$ can be $C_1$–$C_4$ alkyl; $A'$ is $C_1$–$C_4$ alkylene; and R can be $SO_2$.

U.S. Pat. No. 3,671,502 to Samour et al. issued June 20, 1972, discloses co-polymers useful as binders in the production of non-wovens. These co-polymers consist essentially of from about 5 to about 90% of a monomer having the formula:

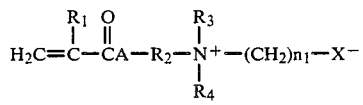

wherein $R_1$ is hydrogen or methyl; A is oxygen or —NH—; $R_2$ is ethylene, propylene, 2-hydroxypropylene or 2-acetoxypropylene; $R_3$ and $R_4$ are alkyl; $n_1$ is 1 to 4; and $X^-$ is $SO_3-$ or $CO_2-$; and from about 10 to about 95% by weight of a hydroxyacrylate such as a polyglycerol acrylate/methacrylate having the formula:

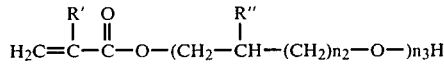

wherein $R'$ is hydrogen or methyl; $R''$ is hydrogen, methyl or hydroxy; $n_2$ is 0 when $R''$ is hydrogen or methyl (e.g. an ethylene group); and $n_3$ is 2 to 4.

U.S. Pat. No. 3,301,783 to Dickson, et al., issued Jan. 31, 1967, discloses oxyalkylated, acylated, alkylated, carbonylated and olefinated derivatives of polyalkyleneimines, in particular polyethyleneimines (PEIs). For the oxyalkylated derivatives, the alkylene oxide (e.g. ethylene oxide) is reacted with the polyalkyleneimine in a mole ratio of from 1:1 to 1000:1, and preferably in a ratio of from 1:1 to 200:1. Among the ethoxylated PEIs disclosed are Examples $1-0_7$ and $1-0_8$ formed by condensing 105 and 200 moles, respectively, of ethylene oxide with a 900 M.W. PEI. The degree of ethoxylation calculates out to about 4.5 and about 8 ethoxy groups per reactive site, respectively. See also Examples $27-0_5$ and $27-0_6$ which disclose ethoxylated polypropyleneimines (M.W. 500) which have about 4 and about 8 ethoxy units per reactive site, respectively. Amongst the numerous disclosed uses of these polyalkyleneimine derivatives is a teaching that they are useful as detergents, softening agents, and anti-static agents. Preferred uses disclosed by this patent are as chelating agents, lubricating oil additives, emulsifying agents, and cutting oils.

U.S. Pat. No. 2,792,371 to Dickson, issued May 14, 1957, teaches a process for breaking petroleum emulsions with oxyalkylated tetraethylene pentaamines (TEPA). Ethoxylated TEPAs specifically disclosed include those having about 5 (Example 3aa), about 7 (Example 4aa), about 8.5 (Example 5a) and about 15.5 (Example 8c) ethoxy units per reactive site. Similarly, U.S. Pat. No. 2,792,370 to Dickson issued May 14, 1957, teaches a process for breaking petroleum emulsions with oxyalkylated triethylene tetramines (TETAs) including those having about 5.5 (Example 3aa), about 7.5 (Example 4aa), about 9 (Example 5a) and about 16.5 (Example Bc) ethoxy units per reactive site. See also U.S. Pat. No. 2,792,372 to Dickson, issued May 14, 1957, (oxyalkylated higher PEAs used to break petroleum emulsions); U.S. Pat. No. 2,792,369 to Dickson, issued May 14, 1957 (oxyalkylated diethylene triamines used to break petroleum emulsions).

U.S. Pat. No. 4,171,278 to Andree et al., issued Oct. 16, 1979, discloses cold water detergent compositions containing a detergent surfactant (e.g. anionic) and a hydroxyalkyl amine in a weight ratio of 100:1 to 1:1. The amine can have the formula:

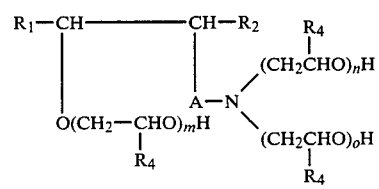

wherein $R_1$ is $C_1$–$C_{16}$ alkyl; $R_2$ is H or $C_1$–$C_{16}$ alkyl; $R_1+R_2$ have 6–20 carbon atoms; $R_4$ is H or methyl; m, n, and o, are each 0 to 3 and A is bridging group such as

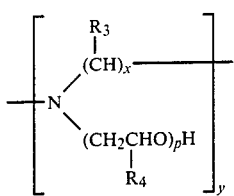

wherein $R_3$ is H or methyl; x is 2 to 6; y is 1 to 3; and p is 0 to 3; the sum of m to p being 1 to 5.5, and preferably 1 to 2. See also German Patent Document No. 2,165,900 to Henkel, published July 5, 1973, which discloses a washing agent for graying prevention formed by the reaction product of a PEI with an alkylglycidylether and ethylene oxide (2-hydroxyethyl moiety at each reactive site).

There are several patents which disclose detergent compositions, shampoo compositions and the like containing slightly ethoxylated PEIs (ethylene oxide:PEI weight ratio of 4:1 or less) to enhance the deposition and retention of particulate substances such as antimicrobials. See, for example, U.S. Pat. No. 3,489,686 to Parran, issued Jan. 13, 1970; U.S. Pat. No. 3,580,853 to Parran, issued May 25, 1971: British Patent Specification No. 1,111,708 to Procter & Gamble published May 1, 1968, U.S. Pat. No. 3,549,546 to Moore, issued Dec. 22, 1970; and U.S. Pat. No. 3,549,542 to Hloderby, issued Dec. 22, 1970.

DISCLOSURE OF THE INVENTION

The present invention relates to water-soluble cationic compounds having clay soil removal/anti-redeposition properties useful in detergent compositions. These compounds are selected from:

(1) ethoxylated cationic diamines having the formula:

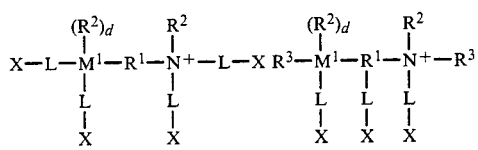

or

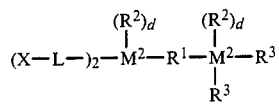

(2) ethoxylated cationic polyamines having the formula:

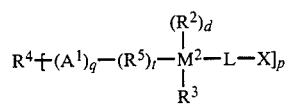

(3) ethoxylated cationic polymers having the general formula:

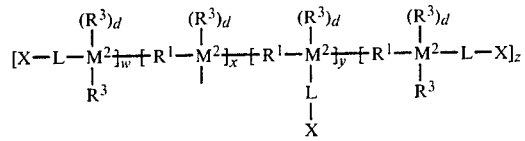

and (4) mixtures thereof, wherein $A^1$ is

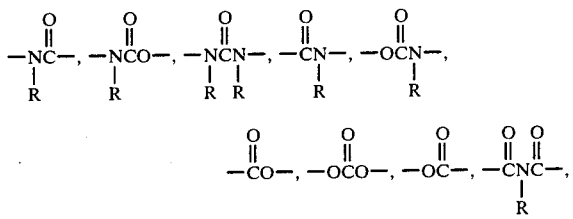

or $-O-$; R is H or $C_1$-$C_4$ alkyl or hydroxyalkyl; $R^1$ is $C_2$-$C_{12}$ alkylene, hydroxyalkylene, alkenylene, arylene, alkarylene, or a $C_2$-$C_3$ oxyalkylene moiety having from 2 to about 20 oxyalkylene units provided that no O—N bonds are formed; each $R^2$ is $C_1$-$C_8$ alkyl or hydroxyalkyl, benzyl, the moiety $-L-X$ or two $R^2$ together form the moiety $-(CH_2)_r-A^2-(CH_2)_s-$, wherein $A^2$ is $-O-$ or $-CH_2-$, r is 1 or 2, s is 1 or 2, and r+s is 3 or 4; each $R^3$ is $C_1$-$C_4$ alkyl or hydroxyalkyl, the moiety $-L-X$, or two $R^3$ or one $R^2$ and $R^3$ together form the moiety $-(CH_2)_r-A^2-(CH_2)_s-$; $R^4$ is a substituted $C_3$-$C_{12}$ alkyl, hydroxyalkyl, alkenyl, aryl or alkaryl group having p substitution sites; $R^5$ is $C_1$-$C_{12}$ alkylene, hydroxyalkylene, alkenylene, arylene or alkarylene, or a $C_2$-$C_3$ oxyalkylene moiety having from 2 to about 20 oxyalkylene units provided that no O—O or O—N bonds are formed; $M^1$ is an $N^+$ or N group; each $M^2$ is an $N^+$ or N group and at least one $M^2$ is an $N^+$ group; X is a nonionic group selected from the group consisting of H, $C_1$-$C_4$ alkyl or hydroxyalkyl ester or ether groups, and mixtures thereof; L is a hydrophilic chain which contains the polyoxyalkylene moiety $-[(R^6O)_m(CH_2CH_2O)_n]-$, wherein $R^6$ is $C_3$-$C_4$ alkylene or hydroxyalkylene and m and n are numbers such that the moiety $-(CH_2CH_2O)_n-$ comprises at least about 50% by weight of said polyoxyalkylene moiety; d is 1 when $M^1$ or $M^2$ is an $N^+$ group, and is 0 when $M^1$ or $M^2$ is an N group; for said cationic diamines, n is at least about 6; for said cationic polyamines and cationic polymers, n is at least about 3; p is from 3 to 8; q is 1 or 0; t is 1 or 0, provided that t is 1 when q is 1; w is 1 or 0; x+y+z is from 2 to 9.

The cationic compounds of the present invention provide clay soil removal benefits while being anionic detergent surfactant compatible. It is believed that the positively charged cationic groups cause adsorption of the compound onto the negatively charged layers of the clay particle. It is also believed that the hydrophilic ethoxy units of the compound swell the clay particle so that it loses its cohesive character and is swept away in the wash water.

The anti-redeposition benefits provided by these cationic compounds are also believed to be due to the positively charged cationic groups which cause it to be adsorbed onto soil suspended in the wash water. As more and more of these compounds adsorb onto the suspended soil, it becomes encased within a hydrophilic layer provided by the attached ethoxy units. As such, the hydrophilically encased soil is prevented from redepositing on fabrics, in particular hydrophobic fabrics such as polyester, during the laundering cycle.

Cationic Compounds

The water-soluble cationic compounds of the present invention useful in detergent compositions are selected from ethoxylated cationic diamines, ethoxylated cationic polyamines, ethoxylated cationic polymers and mixtures thereof as previously defined.

In the preceding formulas, $R^1$ can be branched (e.g.

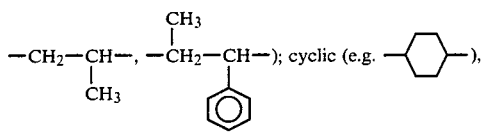

or most preferably linear

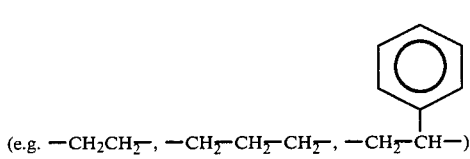

alkylene, hydroxyalkylene, alkenylene, alkarylene or oxyalkylene. $R^1$ is preferably $C_2$-$C_6$ alkylene for the ethoxylated cationic diamines. For the ethoxylated cationic polymers, in particular the ethoxylated quaternized polyalkyleneamines, $C_2$-$C_3$ alkylenes (ethylene, propylene) are preferred for $R^1$ with ethylene being most preferred. Each $R^2$ is preferably $C_1$-$C_4$ alkyl or hydroxyalkyl and most preferably methyl; each $R^3$ is preferably methyl or the moiety —L—X.

The positive charge of the $N^+$ groups is offset by the appropriate number of counter anions. Suitable counter anions include $Cl^-$, $Br^-$, $SO_3^{-2}$, $SO_4^{-2}$, $PO_4^{-2}$, $MeOSO_3^-$ and the like. Particularly preferred counter anions are $Cl^-$ and $Br^-$.

X can be a nonionic group selected from hydrogen (H), $C_1$-$C_4$ alkyl or hydroxyalkyl ester or ether groups, or mixtures thereof. Preferred esters or ethers are the acetate ester and methyl ether, respectively. The particularly preferred nonionic groups are H and the methyl ether.

In the preceding formulas, hydrophilic chain L usually consists entirely of the polyoxyalkylene moiety —[$(R^6O)_m(CH_2CH_2-O_n)$—]. The moieties —($R^6O)_m$— and —$(CH_2CH_2O)_n$— of the polyoxyalkylene moiety can be mixed together or preferably form blocks of —$(R^6O)_m$— and —$(CH_2CH_2O)_n$— moieties. $R^6$ is preferably $C_3H_6$ (propylene); m is preferably from 0 to about 5 and is most preferably 0, i.e. the polyoxyalkylene moiety consists entirely of the moiety —$(CH_2CH_2O)_n$—. The moiety —$(CH_2CH_2O)_n$— preferably comprises at least about 85% by weight of the polyoxyalkylene moiety and most preferably 100% by weight (m is 0).

In the preceding formulas, $M^1$ and each $M^2$ are preferably an $N^+$ group for cationic diamines and polyamines. For the cationic polymers, the $M^2$ groups are typically a mixture of from about 50 to 100% $N^+$ groups and from 0 to about 50% N groups.

Preferred ethoxylated cationic diamines have the formula:

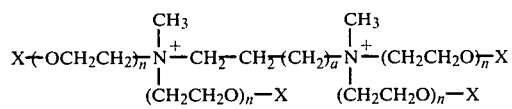

wherein X and n are defined as before, and a is from 0 to 4 (e.g. ethylene, propylene, hexamethylene). For preferred ethoxylated cationic diamines, n is at least about 12 with a typical range of from about 12 to about 42.

In the preceding formula for the ethoxylated cationic polyamines, $R^4$ (linear, branched, or cyclic) is preferably a substituted $C_3$-$C_6$ alkyl, hydroxyalkyl or aryl group; $A^1$ is preferably

n is preferably at least about 12, with a typical range of from about 12 to about 42; p is preferably from 3 to 6. When $R^4$ is a substituted aryl or alkaryl group, q is preferably 1 and $R^5$ is preferably $C_2$-$C_3$ alkylene. When $R^4$ is a substituted alkyl, hydroxyalkyl, or alkenyl group, and when q is 0, $R^5$ is preferably a $C_2$-$C_3$ oxyalkylene moiety; when q is 1, $R^5$ is preferably $C_2$-$C_3$ alkylene.

These ethoxylated cationic polyamines can be derived from polyamino amides such as:

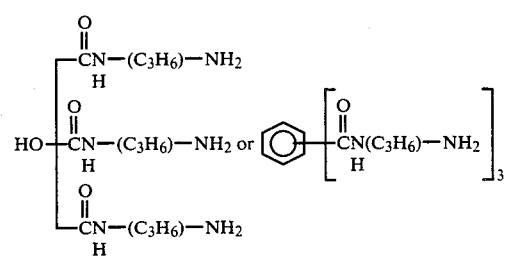

These ethoxylated cationic polyamines can also be derived from polyaminopropyleneoxide derivatives such as:

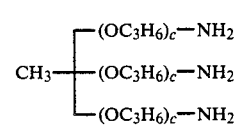

wherein each c is a number from 2 to about 20.

Preferred ethoxylated cationic polymers are the ethoxylated quaternized $C_2$-$C_3$ polyalkyleneamines. Particularly preferred ethoxylated polyalkyleneamines are the ethoxylated quaternized polyethyleneamines (PEAs). These preferred compounds comprise units having the general formula:

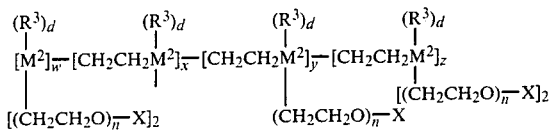

wherein $M^2$, $R^3$, X, d, w, x, y, z and n are defined as before.

Prior to ethoxylation, the PEAs used in preparing compounds of the present invention have the following general formula:

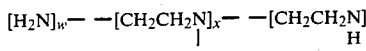

wherein $x+y+z$ is from 2 to 9; and w is 0 or 1 (molecular weight of from about 100 to about 400). Each hydrogen atom attached to each nitrogen atom represents an active site for subsequent ethoxylation. For preferred PEAs, $x+y+z$ is from about 3 to about 7 (molecular weight of from about 140 to about 310). These PEAs can be obtained by reactions involving ammonia and ethylene dichloride, followed by fractional distillation. The common PEAs obtained are triethylenetetramine (TETA) and tetraethylenepentamine (TEPA). Above the pentamines, i.e., the hexamines, heptamines, octamines and possibly nonamines, the cogenerically derived mixture does not appear to separate by distillation and can include other materials such as cyclic amines and particularly piperazines. There can also be present cyclic amines with side chains in which nitrogen atoms appear. See U.S. Pat. No. 2,792,372 to Dickson, issued May 14, 1957, which describes the preparation of PEAs.

The minimum degree of ethoxylation required for preferred clay soil removal/anti-redeposition performance can vary depending upon the number of units in the PEA. Where $y+z$ is 2 or 3, n is preferably at least about 6. Where $y+z$ is from 4 to 9, suitable benefits are achieved when n is at least about 3. For most preferred ethoxylated PEAs, n is at least about 12 with a typical range of from about 12 to about 42.

The level at which the ethoxylated cationic compound(s) can be present in the detergent compositions can vary depending upon the compounds used, the particular detergent formulation (liquid, granular) and the benefits desired. These compositions can be used as laundry detergents, laundry additives, and laundry pretreatments. Generally, the ethoxylated cationic compounds can be included in an amount of from about 0.05 to about 95% by weight of the composition, with the usual range being from about 0.1 to about 10% by weight for laundry detergents. In terms of the benefits achieved, preferred detergent compositions can comprise from about 0.5 to about 5% by weight of the ethoxylated cationic compounds of the present invention. Typically, these preferred compositions comprise from about 1 to about 3% by weight of these compounds. These compounds are normally present at a level that provides from about 2 ppm to about 200 ppm, preferably from about 10 ppm to about 100 ppm, of the compound in the wash solution at recommended U.S. usage levels, and normally from about 30 ppm to about 1000 ppm, preferably from about 50 ppm to about 500 ppm for European usage levels.

Methods for Making Ethoxylated Cationic Compounds

A. Method 1

Cationic compounds of the present invention can be prepared according to the following scheme:

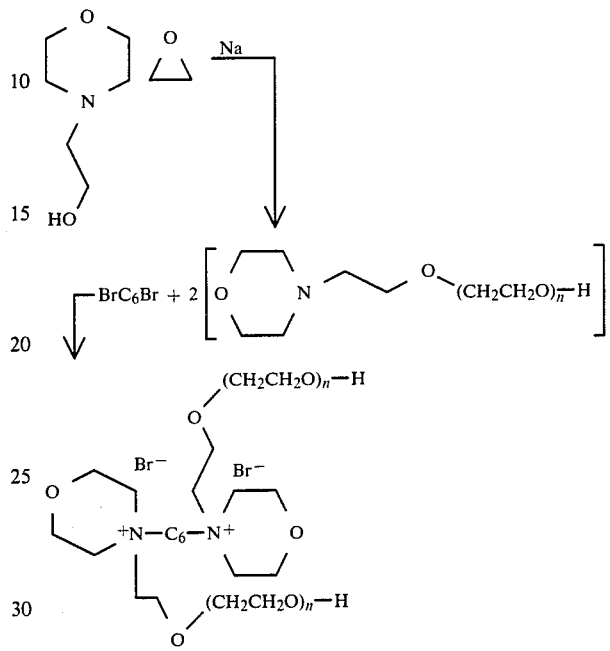

The synthesis of one such cationic compound is described as follows:

EXAMPLE 1

Step 1: Ethoxylation

N-2-hydroxyethylmorpholine (0.8 moles) is placed in a flask equipped with mechanical stirrer, condenser, argon inlet, ethylene oxide sparger, and internal thermometer. After purging with argon, NaH (0.2 moles) is added to the flask. The reaction mixture is stirred until the NaH has reacted. Ethylene oxide is then added with vigorous stirring while maintaining the temperature at about 80°–120° C. The reaction is stopped when the ethoxylated compound has a degree of ethoxylation of about 11.

Step 2: Quaternization

The ethoxylated compound (0.03 moles) from step 1 is mixed with 1,6-dibromohexane (0.015 moles). The reaction mixture is mixed, sealed in a jar, and heated to 80° C. for ten days to provide crude quaternized 1,6-bis[(-N-morpholiniopolyethoxylate (11)]-hexane dibromide.

B. Method 2

The ethoxylated cationic compounds of the present invention can also be prepared by standard methods for ethoxylating and quaternizing amines. There is preferably an initial step of condensing sufficient ethylene oxide to provide 2-hydroxyethyl groups at each reactive site (hydroxyethylation). This initial step can be omitted by starting with a 2-hydroxyethyl amine. The appropriate amount of ethylene oxide is then condensed with these 2-hydroxyethylamines using an alkali metal (e.g., sodium, potassium), or a hydride or hydroxide thereof, as the catalyst to provide the respective ethoxylated amines. The total degree of ethoxylation per reactive site (n) can be determined according to the following formula:

$$\text{Degree of Ethoxylation} = E/(A \times R)$$

wherein E is the total number of moles of ethylene oxide condensed (including hydroxyethylation), A is the number of moles of the starting amine, and R is the number of reactive sites (typically 4 for diamines, $2 \times p$ for polyamines, and $3+y+z$ for the amine polymers) for the starting amine. The ethoxylated amine can then be quaternized with an alkyl halide such as methyl bromide to form the ethoxylated cationic compound.

Representative syntheses of ethoxylated cationic compounds of the present invention by this method are as follows:

EXAMPLE 2a

Step 1: Ethoxylation 1,6-hexamethylenediamine (100 g., 0.86 moles) was placed in a flask and heated under argon to 86° C. Ethylene oxide (EO) was bubbled into the flask. The reaction temperature was gradually raised to 120° C. over a time period of about 7.5 hours and then raised briefly to 158° C. and cooled back to 100° C. N—NMR indicated that about 4 moles of EO had been incorporated at this point.

Sodium spheres (1.24 g., 0.05 moles) were added and the reaction was stirred overnight after which the sodium had been consumed. The addition of EO was resumed and the reaction temperature raised to 120° C. After about 3 hours, H—NMR indicated that about 10 moles of EO had been incorporated per mole of the diamine. An additional portion of sodium spheres (3.6 g., 0.15 moles) was added and ethoxylation was continued. The temperature was allowed to rise to 125°-130° C. Ethoxylation was continued for about 22 hours. The reaction was terminated when about 96 moles of EO had been taken up per mole of the diamine to give a total degree of ethoxylation of about 24.

Step 2: Quaternization

A portion of the ethoxylated diamine (25 g., 0.0057 moles) from step 1 was quaternized by first dissolving the diamine in methanol (100 ml.) containing a little NaOH. An excess of methyl bromide was added using a dry ice condenser. The reaction mixture was allowed to stand overnight after which the pH had dropped to about 4. NaOH in methanol was added to raise the pH to about 9. The quaternized compound was isolated by stripping off the methanol and remaining methyl bromide. The resulting moist material was washed with several portions of dichloromethane. The combined dichloromethane washes were filtered to remove solids and stripped to yield 27.5 g. of a yellow oil that solidified at room temperature. This oil contained the ethoxylated quaternized diamine.

EXAMPLE 2b

Step 1: Hydroxyethylation

Hexamethylenediamine (817 g., 7.02 moles) which has been dried over molecular sieves is added to a reactor which has been predried using nitrogen and preheated to 150° F. The reactor is then sparged with a heavy flow of nitrogen for 10 minutes to remove dissolved oxygen and to minimize the water content of the diamine to less than 0.1%. After sparging, a nitrogen blanket of 10 psig is maintained in the reactor. Ethylene oxide gas (EO) is then added to the reactor to raise the pressure to 60 psig. After the EO is added, the temperature is raised to 185° F. As EO is condensed during the reaction, more is added to the reactor to maintain the pressure at 50-60 psig. During the reaction, the temperature is maintained at 185° F. Hydroxyethylation is continued until 1180 g. of EO is condensed. The calculated degree of ethoxylation of the hydroxyethylated diamine is 0.95.

Step 2: Oxyethylation

The hydroxyethylated diamine from Step (1) is cooled to 140° F. and then a 40% KOH solution (98 g.) as the catalyst is added to the reactor. The reactor temperature is then raised to 212° F. The reactor is sparged with nitrogen for 90 minutes at 212° F. to remove dissolved oxygen and water. The reaction mixture is then sparged with nitrogen for an additional 30 minutes while being circulated through an external cooling loop to achieve a water content of less than 0.1%. After a nitrogen blanket of 10 psig is placed on the reactor, EO gas is added to the reactor to raise the pressure to 50 psig. After the EO is added, the temperature is raised to 280° F. As EO is condensed during the reaction, more is added to maintain a reactor pressure of 50-60 psig. The reaction temperature is maintained at 280°-300° F. During this intermediate oxyethylation, 4510 g. of EO is condensed to give a calculated intermediate degree of ethoxylation of 4.6. After this intermediate oxyethylation, about two-thirds of this intermediate product is removed from the reactor while a 10 psig nitrogen blanket is maintained. EO gas is then added to the reactor to raise the pressure to 50 psig. The reactor temperature is then raised to 280° F. As EO is condensed, more is added to maintain a reactor pressure of 50-60 psig. The reaction temperature is maintained at 280°-300° F. During this final oxyethylation, 8004 g. of EO is added to give a calculated total degree of ethoxylation of 24. After this final ethoxylation, the ethoxylated diamine is cooled to 180° F. and the reactor is sparged with nitrogen for 15 minutes to remove all unreacted EO. The ethoxylated diamine is then drained into a container blanketed with nitrogen. This container is held at a temperature of 120° F. until the quaternization step.

Step 3: Quaternization

A 60% aqueous solution of the ethoxylated diamine from Step (2) is prepared by adding distilled, deionized or demineralized water. If necessary, the pH of this 60% solution is adjusted to 10.5-11.0 This 60% solution is then added to a dry, glass lined reactor. The solution is then sparged with a strong flow of nitrogen or argon for 15 minutes at about 80° F. while being agitated. After a nitrogen or argon blanket of 5 psig is placed in the reactor, methyl chloride gas is added to the reactor to a pressure of 50-55 psig. After methyl chloride is added, agitation is started again and the reaction temperature is raised to 165°-170° F. As methyl chloride gas condenses into the reaction solution, the reactor is periodically recharged with methyl chloride to maintain a pressure of 50-55 psig, until quaternization is complete. The pH during quaternization, is monitored to ensure that the reaction pH is maintained above 8.5. After quaternization is complete, the solution of quaternized ethoxylated diamine is sparged with nitrogen for 2 hours at 160° F. to reduce the residual methyl chloride in the solution to less than 20 ppm.

EXAMPLE 3

Step 1: Ethoxylation

Tetraethylenepentamine (TEPA) (M.W. 189, 13.5 g., 0.071 moles) was placed in a nominally dry flask and dried by stirring for 0.5 hrs. at 110°–120° C. under vacuum (pressure less than 1 mm). The vacuum was released by drawing ethylene oxide (EO) from a prepurged trap connected to a supply tank. Once the flask was filled with EO, an outlet stopcock was carefully opened to a trap connected to an exhaust bubbler. After 3 hrs. stirring at 115°–125° C., H—NMR analysis indicated the degree of ethoxylation was 1 per reactive site. The reaction mixture was cooled while being swept with argon and 0.5 g. (0.0125 moles) of 60% sodium hydride in mineral oil was then added. The stirred reaction mixture was swept with argon until hydrogen evolution ceased. EO was then added to the mixture as a sweep under atmospheric pressure at 117°–135° C. with moderately fast stirring. After 31 hrs., 459 g. (10.43 moles) of EO had been added to give a calculated total degree of ethoxylation of 21.

Step 2: Quaternization

A 34.8 g. (0.0052 moles) portion of the ethoxylated TEPA from step 1 which was a brown waxy solid, was dissolved in $D_2O$ to give a 50% solution. The pH of the solution was about 8. The solution was heated to 60° C. and methyl bromide gas swept through the reaction vessel whose exit was connected to a bubbler. Several times during the reaction, the pH became acidic and $NaHCO_3$ was added to the reaction to maintain the pH at about 8. After about 20 hrs. a sweep bubbler was placed below the reaction mixture surface so that the methyl bromide was bubbled through the mixture while the stirring rate was increased. After a total of 22 hrs., the reaction mixture was diluted to 25% and dialized to remove salts. The reaction mixture was then freeze dried to give a pale yellowish tan crystalline solid as the ethoxylated quaternized TEPA.

Clay Soil Removal/Anti-Redeposition Properties of Various Ethoxylated Quaternized Amines A. Experimental Method 1. Clay Soil Removal Clay soil removal comparisons were conducted in a standard 1 liter Tergotometer employing water of 7 grain hardness (3:1 $Ca^{++}$:$Mg^{++}$) and a temperature of 100° F. Soiled swatches were washed in the Tergotometer for 10 minutes and rinsed twice with water (7 grain hardness) at 70° F. for 2 minutes.

65% polyester/35% cotton blend fabric was used for the swatches. The swatches were 5 inches by 5 inches in size and were soiled by dipping in an aqueous slurry of local clay and subsequently baked to remove the water. The dipping and baking was repeated 5 times.

One wash employed 2000 ppm of a control liquid detergent composition containing the following surfactants:

| Surfactant | Amount (%) |
|---|---|
| Sodium $C_{14}$–$C_{15}$ alkyl ethoxysulfate | 10.8 |
| $C_{13}$ linear alkylbenzene sulfonic acid | 7.2 |
| $C_{12}$–$C_{13}$ alcohol polyethoxylate (6.5) | 6.5 |
| $C_{12}$ alkyl trimethylammonium chloride | 1.2 |

A second wash used the same detergent composition but also containing an ethoxylated quaternized amine at 20 ppm. Neither composition contained optical brighteners. The product washes approximated a conventional home use laundry situation. After laundering, the swatches were dried in a mini-dryer.

The swatches were graded before and after washing on a Gardner Whiteness meter reading the L, a, and b coordinates. Whiteness (W) was calculated as:

$$W = \frac{7L^2 - 40Lb}{700}$$

The clay soil removal performance of each detergent composition was determined by finding the difference in whiteness (W) before and after washing as:

$$\Delta W = W_{after} - W_{before}$$

The improvement in clay soil removal performance of the composition containing the ethoxylated quaternized amine was measured as the difference in W values ($\Delta^2 W$) relative to the control composition.

2. Anti-Redeposition

Anti-redeposition comparisons were conducted in a 5 pot Automatic Miniwasher (AMW) employing 7 grain hardness water and temperature of 95° F. Test swatches were washed for 10 minutes and rinsed twice with water (7 grain hardness) at 75° F. for 2 minutes.

After the AMW pots were filled with 6 liters of water each, the detergent composition to be tested (control or containing 20 ppm ethoxylated quaternized amine as in clay soil removal test) was added and agitated for 2 minutes. A background soil mixture (200 ppm artificial body soil, 100 ppm vacuum cleaner soil and 200 ppm clay soil) was then added and agitated for an additional 3 minutes. Three 5 inch square test swatches (50% polyester/50% cotton T-shirt material) were then added, along with two 80% cotton/20% polyester terry clothes and two 11 inch square swatches of 100% polyester knit fabric. The 10 minute wash cycle commenced at this point.

Following the rinse cycle, the test swatches were dried in a mini-dryer. Gardner Whiteness meter readings (L, a and b) were then determined for the three test swatches. Anti-redeposition performance (ARD) was then calculated according to the following equation.

$$ARD = \frac{7L^2 - 40Lb}{700}$$

The ARD values for the three test swatches were then averaged. The improvement in anti-redeposition performance of the composition containing the ethoxylated quaternized amine was measured as the difference in ARD values ($\Delta ARD$) relative to the control composition.

B. Test Results

The results from testing the clay-soil removal and anti-redeposition preformance of various ethoxylated quaternized amines is shown in the following Table:

| Amine* Type | Amine M.W. | Degree of Ethoxylation | Quat** Group | $\Delta^2 W$ | $\Delta ARD$ |
|---|---|---|---|---|---|
| EDA | 60 | 12 | $C_1$ | 8.3 | — |
|  |  | 24 |  | 9.5 | — |
|  |  | 42 |  | 9.1 | — |
| PDA | 74 | 24 | $C_1$ | 8.5 | 19.4 |
| HMDA | 100 | 3 | $C_1$ | 1.2 | — |

-continued

| Amine* Type | Amine M.W. | Degree of Ethoxylation | Quat** Group | Δ²W | ΔARD |
|---|---|---|---|---|---|
|  |  | 6 |  | 4.6 | 17.7 |
|  |  | 12 |  | 5.0 | — |
|  |  | 24 |  | 9.4 | 19.8 |
|  |  | 35 |  | 6.7 | 16.8 |
|  |  | 24 | $C_4$ | 8.7 | — |
|  |  | 24 | $C_8$ | 7.3 | — |
|  |  | 24 | Bz | 6.8 | — |
| PMDA | — | 9 | $C_1$ | — | 16.8 |
| PEA | 103 | 3 | $C_1$ | 2.0 | 12.2 |
|  |  | 6 |  | 6.3 | 16.4 |
|  |  | 12 |  | 8.5 | 17.7 |
|  |  | 24 |  | 7.6 | 16.4 |
|  |  | 36 |  | 9.5 | — |
| PEA | 189 | 18 | $C_1$ | 3.9 | — |
|  |  | 22 |  | 6.0 | 18.3 |
| PEA | 309 | 24 | $C_1$ | 4.4 | 17.0 |

*EDA = ethylenediamine, PDA = propylenediamine, HMDA = hexamethylenediamine, PMDA = 1,3-bis-(N—morpholino)-propane, PEA = polyethyleneamine.
**$C_1$ = methyl, $C_4$ = butyl, Bz = benzyl.

For comparison, PEG 6000 (polyethylene glycol having M.W. of 6000) has a $\Delta^2W$ value of 4.9 and a $\Delta ARD$ value of 8.9.

Detergent Surfactants

The amount of detergent surfactant included in the detergent compositions of the present invention can vary from about 1 to about 75% by weight of the composition depending upon the detergent surfactant(s) used, the type of composition to be formulated (e.g. granular, liquid) and the effects desired. Preferably, the detergent surfactant(s) comprises from about 10 to about 50% by weight of the composition. The detergent surfactant can be nonionic, anionic, ampholytic, zwitterionic, cationic, or a mixture thereof:

A. Nonionic Surfactants

Suitable nonionic surfactants for use in detergent compositions of the present invention are generally disclosed in U.S. Pat. No. 3,929,678 to Laughlin et al., issued Dec. 30, 1975 at column 13, line 14 through column 16, line 6 (herein incorporated by reference). Classes of nonionic surfactants included are:

1. The polyethyleneoxide condensates of alkyl phenols. These compounds include the condensation products of alkyl phenols having an alkyl group containing from about 6 to 12 carbon atoms in either a straight chain or branched chain configuration with ethylene oxide, the ethylene oxide being present in an amount equal to 5 to 25 moles of ethylene oxide per mole of alkyl phenol. The alkyl substituent in such compounds can be derived, for example, from polymerized propylene, diisobutylene, and the like. Examples of compounds of this type include nonyl phenol condensed with about 9.5 moles of ethylene oxide per mole of nonyl phenol; dodecylphenol condensed with about 12 moles of ethylene oxide per mole of phenol; dinonyl phenol condensed with about 15 moles of ethylene oxide per mole of phenol; and diisooctyl phenol condensed with about 15 moles of ethylene oxide per mole of phenol. Commercially available nonionic surfactants of this type include Igepal CO-630, marketed by the GAF Corporation, and Triton X-45, X-114, X-100, and X-102, all marketed by the Rohm & Haas Company.

2. The condensation products of aliphatic alcohols with from about 1 to about 25 moles of ethylene oxide. The alkyl chain of the aliphatic alcohol can either be straight or branched, primary or secondary, and generally contains from about 8 to about 22 carbon atoms. Examples of such ethoxylated alcohols include the condensation product of myristyl alcohol condensed with about 10 moles of ethylene oxide per mole of alcohol; and the condensation product of about 9 moles of ethylene oxide with coconut alcohol (a mixture of fatty alcohols with alkyl chains varying in length from 10 to 14 carbon atoms). Examples of commercially available nonionic surfactants of this type include Tergitol 15-S-9, marketed by Union Carbide Corporation, Neodol 45-9, Neodol 23-6.5, Neodol 45-7, Neodol 45-4, marketed by Shell Chemical Company, and Kyro EOB, marketed by The Procter & Gamble Company.

3. The condensation products of ethylene oxide with a hydrophobic base formed by the condensation of propylene oxide with propylene glycol. The hydrophobic portion of these compounds has a molecular weight of from about 1500 to 1800 and exhibits water insolubility. The addition of polyoxyethylene moieties to this hydrophobic portion tends to increase the water solubility of the molecule as a whole, and the liquid character of the product is retained up to the point where the polyoxyethylene content is about 50% of the total weight of the condensation product, which corresponds to condensation with up to about 40 moles of ethylene oxide. Examples of compounds of this type include certain of the commercially available Pluronic surfactants, marketed by Wyandotte Chemical Corporation.

4. The condensation products of ethylene oxide with the product resulting from the reaction of propylene oxide and ethylenediamine. The hydrophobic moiety of these products consists of the reaction product of ethylenediamine and excess propylene oxide, the moiety having a molecular weight of from about 2500 to about 3000. This hydrophobic moiety is condensed with ethylene oxide to the extent that the condensation product contains from about 40% to about 80% by weight of polyoxyethylene and has a molecular weight of from about 5,000 to about 11,000. Examples of this type of nonionic surfactant include certain of the commercially available Tetronic compounds, marketed by Wyandotte Chemical Corporation.

5. Semi-polar nonionic detergent surfactants which include water-soluble amine oxides containing one alkyl moiety of from about 10 to 18 carbon atoms and 2 moieties selected from the group consisting of alkyl groups and hydroxyalkyl groups containing from 1 to about 3 carbon atoms; water-soluble phosphine oxides containing one alkyl moiety of from about 10 to 18 carbon atoms and 2 moieties selected from the group consisting of alkyl groups and hydroxyalkyl groups containing from about 1 to 3 carbon atoms; and water-soluble sulfoxides containing one alkyl moiety of from about 10 to 18 carbon atoms and a moiety selected from the group consisting of alkyl and hydroxyalkyl moieties of from about 1 to 3 carbon atoms.

Preferred semi-polar nonionic detergent surfactants are the amine oxide detergent surfactants having the formula

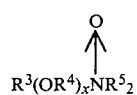

wherein $R^3$ is an alkyl, hydroxyalkyl, or alkyl phenyl group or mixtures thereof containing from about 8 to about 22 carbon atoms; $R^4$ is an alkylene or hydroxyalkylene group containing from 2 to 3 carbon atoms or mixtures thereof; x is from 0 to about 3; and each $R^5$ is an alkyl or hydroxyalkyl group containing from 1 to about 3 carbon atoms or a polyethylene oxide group containing from one to about 3 ethylene oxide groups. The $R^5$ groups can be attached to each other, e.g., through an oxygen or nitrogen atom to form a ring structure.

Preferred amine oxide detergent surfactants are $C_{10}$-$C_{18}$ alkyl dimethyl amine oxide and $C_8$-$C_{12}$ alkoxy ethyl dihydroxy ethyl amine oxide.

6. Alkylpolysaccharides disclosed in U.S. application Ser. No. 371,747 to Ramon A. Llenado, filed Apr. 26, 1982, having a hydrophobic group containing from about 6 to about 30 carbon atoms, preferably from about 10 to about 16 carbon atoms and a polysaccharide, e.g., a polyglycoside, hydrophilic group containing from about 1½ to about 10, preferably from about 1½ to about 3, most preferably from about 1.6 to about 2.7 saccharide units. Any reducing saccharide containing 5 or 6 carbon atoms can be used, e.g. glucose, galactose and galactosyl moieties can be substituted for the glucosyl moieties. (Optionally the hydrophobic group is attached at the 2, 3, 4, etc. positions thus giving a glucose or galactose as opposed to a glucoside or galactoside.) The intersaccharide bonds can be, e.g., between the one position of the additional saccharide units and the 2-, 3-, 4-, and/or 6 positions on the preceding saccharide units.

Optionally, and less desirably, there can be a polyalkyleneoxide chain joining the hydrophobic moiety and the polysaccharide moiety. The preferred alkyleneoxide is ethylene oxide. Typical hydrophobic groups include alkyl groups, either saturated or unsaturated, branched or unbranched containing from about 8 to about 18, preferably from about 10 to about 16, carbon atoms. Preferably, the alkyl group is a straight chain saturated alkyl group. The alkyl group can contain up to 3 hydroxy groups and/or the polyalkyleneoxide chain can contain up to about 10, preferably less than 5, most preferably 0, alkyleneoxide moieties. Suitable alkyl polysaccharides are octyl, nonyldecyl, undecyldodecyl, tridecyl, tetradecyl, pentadecyl, hexadecyl, heptadecyl, and octadecyl, di-, tri-, tetra-, penta-, and hexaglucosides, galactosides, lactosides, glucoses, fructosides, fructoses, and/or galactoses. Suitable mixtures include coconut alkyl di-, tri-, tetra-, and pentaglucosides and tallow alkyl tetra-, penta-, and hexaglucosides.

The preferred alkylpolyglycosides have the formula

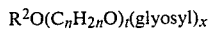

$$R^2O(C_nH_{2n}O)_t(glyosyl)_x$$

wherein $R^2$ is selected from the group consisting of alkyl, alkylphenyl, hydroxyalkyl, hydroxyalkylphenyl, and mixtures thereof in which the alkyl groups contain from about 10 to about 18, preferably from about 12 to about 14, carbon atoms; n is 2 or 3, preferably 2; t is from 0 to about 10, preferably 0; and x is from 1½ to about 10, preferably from about 1½ to about 3, most preferably from about 1.6 to about 2.7. The glycosyl is preferably derived from glucose. To prepare these compounds, the alcohol or alkylpolyethoxy alcohol is formed first and then reacted with glucose, or a source of glucose, to form the glucoside (attachment at the 1-position). The additional glycosyl units can then be attached between their 1-position and the preceding glycosyl units 2-, 3-, 4- and/or 6-position, preferably predominately the 2-position.

7. Fatty acid amide detergent surfactants having the formula:

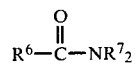

$$R^6-\overset{O}{\underset{\|}{C}}-NR^7_2$$

wherein $R^6$ is an alkyl group containing from about 7 to about 21 (preferably from about 9 to about 17) carbon atoms and each $R^7$ is selected from the group consisting of hydrogen, $C_1$-$C_4$ alkyl, $C_1$-$C_4$ hydroxyalkyl, and —$(C_2H_4O)_xH$ where x varies from about 1 to about 3.

Preferred amides are $C_8$-$C_{20}$ ammonia amides, monoethanolamides, diethanolamides, and isopropanol amides.

B. Anionic Surfactants

Anionic surfactants suitable in detergent compositions of the present invention are generally disclosed in U.S. Pat. No. 3,929,678 to Laughlin et al., issued Dec. 30, 1975 at column 23, line 58 through column 29, line 23 (herein incorporated by reference). Classes of anionic surfactants included are:

1. Ordinary alkali metal soaps such as the sodium, potassium, ammonium and alkylolammonium salts of higher fatty acids containing from about 8 to about 24 carbon atoms, preferably from about 10 to about 20 carbon atoms.

2. Water-soluble salts, preferably the alkali metal, ammonium and alkylolammonium salts, of organic sulfuric reaction products having in their molecular structure an alkyl group containing from about 10 to about 20 carbon atoms and a sulfonic acid or sulfuric acid ester group. (Included in the term "alkyl" is the alkyl portion of acyl groups.)

Examples of this group of anionic surfactants are the sodium and potassium alkyl sulfates, especially those obtained by sulfating the higher alcohols ($C_8$-$C_{18}$ carbon atoms) such as those produced by reducing the glycerides of tallow or coconut oil; and the sodium and potassium alkylbenzene sulfonates in which the alkyl group contains from about 9 to about 15 carbon atoms, in straight chain or branched chain configuration, e.g., those of the type described in U.S. Pat. Nos. 2,220,099 and 2,477,383. Especially valuable are linear straight chain alkylbenzene sulfonates in which the average number of carbon atoms in the alkyl group is from about 11 to 13, abbreviated as $C_{11}$-$C_{13}$LAS.

Preferred anionic surfactants of this type are the alkyl polyethoxylate sulfates, particularly those in which the alkyl group contains from about 10 to about 22, preferably from about 12 to about 18 carbon atoms, and wherein the polyethoxylate chain contains from about 1 to about 15 ethoxylate moieties preferably from about 1 to about 3 ethoxylate moieties. These anionic detergent surfactants are particularly desirable for formulating heavy-duty liquid laundry detergent compositions.

Other anionic surfactants of this type include sodium alkyl glyceryl ether sulfonates, especially those ethers of higher alcohols derived from tallow and coconut oil; sodium coconut oil fatty acid monoglyceride sulfonates and sulfates; sodium or potassium salts of alkyl phenol ethylene oxide ether sulfates containing from about 1 to about 10 units of ethylene oxide per molecule and wherein the alkyl groups contain from about 8 to about 12 carbon atoms; and sodium or potassium salts of alkyl ethylene oxide ether sulfates containing about 1 to about 10 units of ethylene oxide per molecule and wherein the alkyl group contains from about 10 to about 20 carbon atoms.

Also included are water-soluble salts of esters of alphasulfonated fatty acids containing from about 6 to 20 carbon atoms in the fatty acid group and from about 1 to 10 carbon atoms in the ester group; water-soluble salts of 2-acyloxy-alkane-1-sulfonic acids containing from about 2 to 9 carbon atoms in the acyl group and from about 9 to about 23 carbon atoms in the alkane moiety; alkyl ether sulfates containing from about 10 to 20 carbon atoms in the alkyl group and from about 1 to 30 moles of ethylene oxide; water-soluble salts of olefin sulfonates containing from about 12 to 24 carbon atoms; and beta-alkyloxy alkane sulfonates containing from about 1 to 3 carbon atoms in the alkyl group and from about 8 to 20 carbon atoms in the alkane moiety.

3. Anionic phosphate surfactants.
4. N-alkyl substituted succinamates.

C. Ampholytic Surfactants

Ampholytic surfactants can be broadly described as aliphatic derivatives of secondary or tertiary amines, or aliphatic derivatives of heterocyclic secondary and tertiary amines in which the aliphatic radical can be straight chain or branched and wherein one of the aliphatic substituents contains from about 8 to 18 carbon atoms and at least one contains an anionic water-solubilizing group, e.g., carboxy, sulfonate, sulfate. See U.S. Pat. No. 3,929,678 to Laughlin et al., issued Dec. 30, 1975 at column 19, lines 18-35 (herein incorporated by reference) for examples of ampholytic surfactants.

D. Zwitterionic Surfactants

Zwitterionic surfactants can be broadly described as derivatives of secondary and tertiary amines, derivatives of heterocyclic secondary and tertiary amines, or derivatives of quaternary ammonium, quaternary phosphonium or tertiary sulfonium compounds. See U.S. Pat. No. 3,929,678 to Laughlin et al., issued Dec. 30, 1975 at column 19, line 38 through column 22, line 48 (herein incorporated by reference) for examples of zwitterionic surfactants.

E. Cationic Surfactants

Cationic surfactants can also be included in detergent compositions of the present invention. Suitable cationic surfactants include the quaternary ammonium surfactants having the formula:

$$[R^2(OR^3)_y][R^4(OR^3)_y]_2R^5N^+X^-$$

wherein $R^2$ is an alkyl or alkyl benzyl group having from about 8 to about 18 carbon atoms in the alkyl chain; each $R^3$ is selected from the group consisting of $-CH_2CH_2-$, $-CH_2CH(CH_3)-$, $-CH_2CH(CH_2-OH)-$, $-CH_2CH_2CH_2-$, and mixtures thereof; each $R^4$ is selected from the group consisting of $C_1-C_4$ alkyl, $C_1-C_4$ hydroxyalkyl, benzyl, ring structures formed by joining the two $R^4$ groups, $-CH_2CHOH-CHOH-COR^6CHOHCH_2OH$ wherein $R^6$ is any hexose or hexose polymer having a molecular weight less than about 1000, and hydrogen when y is not 0; $R^5$ is the same as $R^4$ or is an alkyl chain wherein the total number of carbon atoms of $R^2$ plus $R^5$ is not more than about 18; each y is from 0 to about 10 and the sum of the y values is from 0 to about 15; and X is any compatible anion.

Preferred of the above are the alkyl quaternary ammonium surfactants, especially the mono-long chain alkyl surfactants described in the above formula when $R^5$ is selected from the same groups as $R^4$. The most preferred quaternary ammonium surfactants are the chloride, bromide and methylsulfate $C_8-C_{16}$ alkyl trimethylammonium salts, $C_8-C_{16}$ alkyl di(hydroxyethyl)-methylammonium salts, the $C_8-C_{16}$ alkyl hydroxyethyl-dimethylammonium salts, and $C_8-C_{16}$ alkyloxypropyl trimethylammonium salts. Of the above, decyl trimethylammonium methylsulfate, lauryl trimethylammonium chloride, myristyl trimethylammonium bromide and coconut trimethylammonium chloride and methylsulfate are particularly preferred.

Detergent Builders

Detergent compositions of the present invention can optionally comprise inorganic or organic detergent builders to assist in mineral hardness control. These builders can comprise from 0 to about 80% by weight of the composition. When included, these builders typically comprise up to about 60% by weight of the detergent composition. Built liquid formulations preferably comprise from about 10 to about 25% detergent builder while built granular formulations preferably comprise from about 10 to about 50% by weight detergent builder.

Suitable detergent builders include crystalline aluminosilicate ion exchange materials having the formula:

$$Na_z[(AlO_2)_z \cdot (SiO_2)_y \cdot xH_2O]$$

wherein z and y are at least about 6, the mole ratio of z to y is from about 1.0 to about 0.5; and x is from about 10 to about 264. Amorphous hydrated aluminosilicate materials useful herein have the empirical formula $$M_z(zAlO_2 \cdot ySiO_2)$$

wherein M is sodium, potassium, ammonium or substituted ammonium, z is from about 0.5 to about 2; and y is 1; this material having a magnesium ion exchange capacity of at least about 50 milligram equivalents of $CaCO_3$ hardness per gram of anhydrous aluminosilicate.

The aluminosilicate ion exchange builder materials are in hydrated form and contain from about 10% to about 28% of water by weight if crystalline, and potentially even higher amounts of water if amorphous. Highly preferred crystalline aluminosilicate ion exchange materials contain from about 18% to about 22% water in their crystal matrix. The preferred crystalline aluminosilicate ion exchange materials are further characterized by a particle size diameter of from about 0.1 micron to about 10 microns. Amorphous materials are often smaller, e.g., down to less than about 0.01 micron. More preferred ion exchange materials have a particle size diameter of from about 0.2 micron to about 4 microns. The term "particle size diameter" represents the average particle size diameter of a given ion exchange material as determined by conventional analytical techniques such as, for example, microscopic determination utilizing a scanning electron microscope. The crystalline aluminosilicate ion exchange materials are usually further characterized by their calcium ion exchange capacity, which is at least about 200 mg. equivalent of $CaCO_3$ water hardness/g. of aluminosilicate, calculated on an anhydrous basis, and which generally is in the range of from about 300 mg. eq./g. to about 352 mg. eq./g. The aluminosilicate ion exchange materials are still further characterized by their calcium ion exchange rate which is at least about 2 grains $Ca^{++}$/gallon/minute/gram/gallon of aluminosilicate (anhydrous basis), and generally lies within the range of from about 2 grains/gallon/minute/gram/gallon to about 6 grains/gallon/minute/gram/gallon, based on calcium ion hardness. Optimum aluminosilicates for builder purposes exhibit a calcium ion exchange rate of at least about 4 grains/gallon/minute/gram/gallon.

The amorphous aluminosilicate ion exchange materials usually have a $Mg^{++}$ exchange capacity of at least about 50 mg. eq. $CaCO_3$/g. (12 mg. $Mg^{++}$/g.) and a $Mg^{++}$ 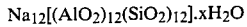 1 grain/gallon/minute/gram/gallon. Amorphous materials do not exhibit an observable diffraction pattern when examined by Cu radiation (1.54 Angstrom Units).

Useful aluminosilicate ion exchange materials are commercially available. These aluminosilicates can be crystalline or amorphous in structure and can be naturally-occurring aluminosilicates or synthetically derived. A method for producing aluminosilicate ion exchange materials is disclosed in U.S. Pat. No. 3,985,669 to Krummel, et al. issued Oct. 12, 1976 (herein incorporated by reference). Preferred synthetic crystalline aluminosilicate ion exchange materials useful herein are available under the designations Zeolite A, Zeolite P (B), and Zeolite X. In an especially preferred embodiment, the crystalline aluminosilicate ion exchange material has the formula $$Na_{12}[(AlO_2)_{12}(SiO_2)_{12}] \cdot xH_2O$$

wherein x is from about 20 to about 30, especially about 27.

Other examples of detergency builders include the various water-soluble, alkali metal, ammonium or substituted ammonium phosphates, polyphosphates, phosphonates, polyphosphonates, carbonates, silicates, borates, polyhydroxysulfonates, polyacetates, carboxylates, and polycarboxylates. Preferred are the alkali metal, especially sodium, salts of the above.

Specific examples of inorganic phosphate builders are sodium and potassium tripolyphosphate, pyrophosphate, polymeric metaphate having a degree of polymerization of from about 6 to 21, and orthophosphate. Examples of polyphosphonate builders are the sodium and potassium salts of ethylene-1,1-diphosphonic acid, the sodium and potassium salts of ethane 1-hydroxy-1,1-diphosphonic acid and the sodium and potassium salts of ethane, 1,1,2-triphosphonic acid. Other phosphorus builder compounds are disclosed in U.S. Pat. Nos. 3,159,581; 3,213,030; 3,422,021; 3,422,137; 3,400,176 and 3,400,148 (all herein incorporated by reference).

Examples of nonphosphorus, inorganic builders are sodium and potassium carbonate, bicarbonate, sesquicarbonate, tetraborate decahydrate, and silicate having a mole ratio of $SiO_2$ to alkali metal oxide of from about 0.5 to about 4.0, preferably from about 1.0 to about 2.4.

Useful water-soluble, nonphosphorus organic builders include the various alkali metal, ammonium and substituted ammonium polyacetates, carboxylates, polycarboxylates and polyhydroxysulfonates. Examples of polyacetate and polycarboxylate builders are the sodium, potassium lithium, ammonium and substituted ammonium salts of ethylenediamine tetraacetic acid, nitrilotriacetic acid, oxydisuccinic acid, mellitic acid, benzene polycarboxylic acids, and citric acid.

Highly preferred polycarboxylate builders are disclosed in U.S. Pat. No. 3,308,067 to Diehl, issued Mar. 7, 1967 (herein incorporated by reference). Such materials include the water-soluble salts of homo- and copolymers of aliphatic carboxylic acids such as maleic acid, itaconic acid, mesaconic acid, fumaric acid, aconitic acid, citraconic acid and methylenemalonic acid.

Other builders include the carboxylated carbohydrates disclosed in U.S. Pat. No. 3,723,322 to Diehl issued Mar. 29, 1973 (herein incorporated by reference).

Other useful builders are sodium and potassium carboxymethyloxymalonate, carboxymethyloxysuccinate, cis-cyclohexanehexacarboxylate, cis-cyclopentanetetracarboxylate phloroglucinol trisulfonate, water-soluble polyacrylates (having molecular weights of from about 2,000 to about 200,000 for example), and the copolymers of maleic anhydride with vinyl methyl ether or ethylene.

Other suitable polycarboxylates are the polyacetal carboxylates disclosed in U.S. Pat. No. 4,144,226, to Crutchfield et al. issued Mar. 13, 1979, and U.S. Pat. No. 4,246,495, to Crutchfield et al., issued Mar. 27, 1979 (both herein incorporated by reference). These polyacetal carboxylates can be prepared by bringing together under polymerization conditions an ester of glyoxylic acid and a polymerization initiator. The resulting polyacetal carboxylate ester is then attached to chemically stable end groups to stabilize the polyacetal carboxylate against rapid depolymerization in alkaline solution, converted to the corresponding salt, and added to a surfactant.

Other useful detergency builder materials are the "seeded builder" compositions disclosed in Belgian Pat. No. 798,856, issued Oct. 29, 1973, (herein incorporated by reference). Specific examples of such seeded builder mixtures are: 3:1 wt. mixtures of sodium carbonate and calcium carbonate having 5 micron particle diameter; 2.7:1 wt. mixtures of sodium sesquicarbonate and calcium carbonate having a particle diameter of 0.5 microns; 20:1 wt. mixtures of sodium sesquicarbonate and calcium hydroxide having a particle diameter of 0.01 micron; and a 3:3:1 wt. mixture of sodium carbonate, sodium aluminate and calcium oxide having a particle diameter of 5 microns.

Other Optional Detergent Ingredients

Other optional ingredients which can be included in detergent compositions of the present invention, in their conventional art-established levels for use (i.e., from 0 to about 20%), include solvents, bleaching agents, bleach activators, soil-suspending agents, corrosion inhibitors, dyes, fillers, optical brighteners, germicides, pH adjusting agents (monoethanolamine, sodium carbonate, sodium hydroxide, etc.), enzymes, enzyme-stabilizing agents, perfumes, fabric softening components, static control agents, and the like.

Detergent Formulations

Granular formulations embodying the detergent compositions of the present invention can be formed by conventional techniques, i.e., by slurrying the individual components in water and then atomizing and spray-drying the resultant mixture, or by pan or drum granulation of the ingredients. Granular formulations preferably comprise from about 10 to about 30% detergent surfactant, usually anionic.

Liquid formulations embodying the detergent compositions can be built or unbuilt. If unbuilt, these compositions conventionally contain approximately 15 to 50% total surfactant, from 0 to 10% of an organic base such as a mono-, di-, or tri-alkanol amine, a neutralization system such as an alkali metal hydroxide and a lower primary alcohol such as ethanol or isopropanol, and approximately 20 to 80% water. Such compositions are normally homogeneous single phase liquids of low viscosity (approximately 100 to 150 centipoise at 75° F.).

Built liquid detergent compositions can be in the form of single phase liquids provided that the builder is solubilized in the mixture at its level of use. Such liquids conventionally contain 10 to 25% total surfactant, 10 to 25% builder which can be organic or inorganic, 3 to 10% of a hydrotrope system and 40 to 77% water. Liquids of this type also have a low viscosity (100 to 150 centipoise at 75° F.). Built liquid detergents incorporating components that form heterogeneous mixtures (or levels of builder that cannot be completely dissolved) can also comprise detergent compositions of the present invention. Such liquids conventionally employ viscosity modifiers to produce systems having plastic shear characteristics to maintain stable dispersions and to prevent phase separation or solid settlement.

Near Neutral Wash pH Detergent Formulations

While the detergent compositions of the present invention are operative within a wide range of wash pHs (e.g. from about 5 to about 12), they are particularly suitable when formulated to provide a near neutral wash pH, i.e. an initial pH of from about 6.0 to about 8.5 at a concentration of from about 0.1 to about 2% by weight in water at 20° C. Near neutral wash pH formulations are better for enzyme stability and for preventing stains from setting. In such formulations, the wash pH is preferably from about 7.0 to about 8.5, and more preferably from about 7.5 to about 8.0.

Preferred near neutral wash pH detergent formulations are disclosed in U.S. application Ser. No. 380,988 to J. H. M. Wertz and P. C. E. Goffinet, filed May 24, 1982. These preferred formulations comprise:

(a) from about 2 to about 60% (preferably from about 10 to about 25%) by weight of an anionic synthetic surfactant as previously defined;

(b) from about 0.25 to about 12% (preferably from about 1 to about 4%) by weight of a cosurfactant selected from the group consisting of:
(i) quaternary ammonium surfactants having the formula:

$$[R^2(OR^3)_y][R^4(OR^3)_y]_2R^5N^+X^-$$

wherein $R^2$, each $R^3$, $R^4$, $R^5$, X and y are as previously defined;

(ii) diquaternary ammonium surfactants having the formula:

$$[R^2(OR^3)_y][R^4(OR^3)_y]_2N^+R^3N^+R^5[R^4(OR^3)_y]_2(X^-)_2$$

wherein $R^2$, $R^3$, $R^4$, y and X are as defined above; particularly preferred are the $C_8$–$C_{16}$ alkyl pentamethylethylenediamine chloride, bromide and methylsulfate salts;

(iii) amine surfactants having the formula:

$$[R^2(OR^3)_y][R^4(OR^3)_y]R^5N$$

wherein $R^2$, $R^3$, $R^4$, $R^5$ and y are as defined above; particularly preferred are the $C_{12}$–$C_{16}$ alkyl dimethyl amines;

(iv) diamine surfactants having the formula:

$$[R^2(OR^3)_y][R^4(OR^3)_y]NR^3NR^5[R^4(OR^3)_y]$$

wherein $R^2$, $R^3$, $R^4$, $R^5$ and y are as defined above; particularly preferred are the $C_{12}$–$C_{16}$ alkyl dimethyl diamines;

(v) amine oxide surfactants having the formula:

$$[R^2(OR^3)_y][R^4(OR^3)_y]R^5N\rightarrow O$$

wherein $R^2$, $R^3$, $R^4$, $R^5$ and y are as defined above; particularly preferred are the $C_{12}$–$C_{16}$ alkyldimethyl amine oxides; and (vi) di(amine oxide) surfactants having the formula:

$$[R^2(OR^3)_y][R^4(OR^3)_y]NR^3NR^5[R^4(OR^3)_y]$$
$$\hspace{2em}\downarrow\hspace{1em}\downarrow$$
$$\hspace{2em}O\hspace{1em}O$$

wherein $R^2$, $R^3$, $R^4$, $R^5$ and y are as defined above; particularly preferred are the $C_{12}$–$C_{16}$ alkyl trimethylethylene di(amine oxides); and (c) from about 5% to about 40% by weight (preferably 7 to about 30% by weight, and most preferably from about 10 to 20% by weight) of a fatty acid containing from about 10 to about 22 carbon atoms (preferably a $C_{10}$–$C_{14}$ saturated fatty acid or mixture thereof); the mole ratio of the anionic surfactant to the cosurfactant being at least 1 and preferably from about 2:1 to about 20:1.

Such compositions also preferably contain from about 3 to about 15% by weight of an ethoxylated alcohol or ethoxylated alkyl phenol (nonionic surfactants) as previously defined. Highly preferred compositions of this type also preferably contain from about 2 to about 10% by weight of citric acid and minor amounts (e.g., less than about 20% by weight) of neutralizing agents, buffering agents, phase regulants, hydrotropes, enzymes, enzyme stabilizing agents, polyacids, suds regulants, opacifiers, antioxidants, bactericides, dyes, perfumes and brighteners, such as those described in U.S. Pat. No. 4,285,841 to Barrat et al., issued Aug. 25, 1981 (herein incorporated by reference).

SPECIFIC EMBODIMENTS OF DETERGENT COMPOSITIONS ACCORDING TO THE PRESENT INVENTION

Embodiment I

The following embodiments illustrate, but are not limiting of, detergent compositions of the present invention:

A granular detergent composition is formulated as follows:

| Component | Wt. % |
|---|---|
| Quat PEA$_{189}$E$_{24}$* | 1.0 |
| Sodium $C_{14}$–$C_{15}$ alkylethoxysulfate | 10.7 |
| $C_{13}$ linear alkyl benzene sulfonic acid | 4.3 |
| $C_{12}$–$C_{14}$ alkylpolyethoxylate (6) | 0.5 |
| Sodium toluene sulfonate | 1.0 |
| Sodium tripolyphosphate | 32.9 |
| Sodium carbonate | 20.3 |
| Sodium silicate | 5.8 |
| Minors and water | Balance to 100 |

*PEA having M.W. of 189, degree of ethoxylation of 24, quaternized with methyl bromide.

The components are added together with continuous mixing to form an aqueous slurry which is then spray dried to form the composition.

Embodiment II

A liquid detergent composition is as follows:

| Component | Wt. % |
| --- | --- |
| Quat PEA$_{189}$E$_{24}$ | 1 |
| Sodium C$_{14}$-C$_{15}$ alkyl polyethoxy (2.5) sulfate | 8.3 |
| C$_{12}$ alkyl dimethyl amine oxide | 3.3 |
| Sodium toluene sulfonate | 5.0 |
| Monoethanolamine | 2.3 |
| Sodium nitrilotriacetate | 18.2 |
| Minors and water | Balance to 100 |

The components are added together with continuous mixing to form the composition.

Embodiments III and IV

Liquid detergent compositions are as follows:

| Component | Wt. % III | Wt. % IV |
| --- | --- | --- |
| Quat HMDA E$_{24}$* | 1.5 | 1.5 |
| C$_{14}$-C$_{15}$ alkylethoxysulfuric acid | 10.8 | — |
| C$_{14}$-C$_{15}$ alkylpolyethoxy (2.25) sulfuric acid | — | 10.8 |
| C$_{13}$ linear alkylbenzene sulfonic acid | 7.2 | 7.2 |
| C$_{12}$ alkyl trimethylammonium chloride | 1.2 | 1.2 |
| C$_{12-13}$ alcohol polyethoxylate (6.5) | 6.5 | 6.5 |
| Coconut fatty acid | 15.0 | 15.0 |
| Citric acid monohydrate | 6.9 | 4.0 |
| Diethylenetriamine pentaacetic acid | 0.9 | 0.9 |
| Protease enzyme | 0.8 | 0.8 |
| Amylase enzyme | 0.3 | 0.3 |
| Monoethanolamine | 13.6 | 2.0 |
| Triethanolamine | 3.0 | 4.0 |
| Sodium hydroxide | — | 2.0 |
| Potassium hydroxide | — | 2.8 |
| 1,2-Propanediol | 5.0 | 5.0 |
| Ethanol | 3.0 | 7.0 |
| Sodium formate | 1.0 | 1.0 |
| Sodium toluene sulfonate | 5.0 | — |
| Minors and water | Balance to 100 | |

*Hexamethylenediamine, degree of ethoxylation of 24, quaternized with methyl bromide.

Embodiment IV is prepared by adding the components together with continuous mixing, in the following order to produce a clear liquid: a paste premix of the alkylbenzene sulfonic acid, 0.9 parts of the sodium hydroxide, propylene glycol, and 2.3 parts of the ethanol; a paste premix of the alkylpolyethoxysulfuric acid, 1.1 parts of the sodium hydroxide and 3.1 parts of the ethanol; alcohol polyethoxylate; premix of monoethanolamine, triethanolamine and brighteners, 1.5 parts potassium hydroxide; balance of the ethanol; citric acid; formate; 1.4 parts potassium hydroxide; fatty acid; pentaacetic acid; alkyl trimethylammonium chloride; adjust pH to about 8.4 with potassium hydroxide, water or citric acid; enzymes; Quat HMDA (50% aqueous solution); and perfume. Embodiment III can be prepared in a similar manner.

Embodiment V

A liquid detergent composition is formulated as follows:

| Component | Wt. % |
| --- | --- |
| Quat PEA$_{189}$E$_{24}$ | 1.0 |
| Sodium C$_{12}$ alkylpolyethoxy (3) sulfate | 12.6 |
| C$_{12}$-C$_{13}$ alcohol polyethoxylate (6.5) | 23.4 |
| Monoethanolamine | 2.0 |
| Ethanol | 9.0 |

| Component | Wt. % |
| --- | --- |
| Citric acid monohydrate | 0.8 |
| Minors and water | Balance to 100 |

The components are added together with continuous mixing to form the composition.

What is claimed is:

1. A water-soluble cationic compound having clay soil removal/anti-redeposition properties selected from the group consisting of:

(1) ethoxylated cationic diamines having formulas A, C, or D:

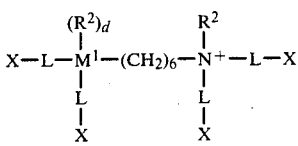

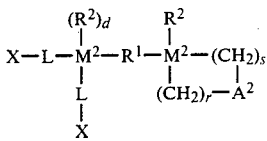

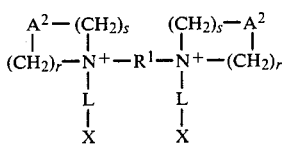

(2) ethoxylated cationic polyamines having the formula:

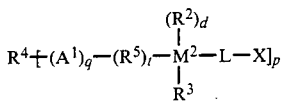

and (3) mixtures thereof, wherein A$^1$ is

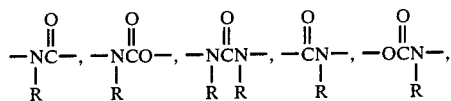

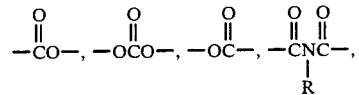

or —O—; R is H or C$_1$-C$_4$ alkyl or hydroxyalkyl; R$^1$ is C$_2$-C$_{12}$ alkylene, hydroxyalkylene, alkenylene, arylene, or alkarylene; each R$^2$ is C$_1$-C$_8$ alkyl or hydroxyalkyl, benzyl, or the moiety —L—X; each R$^3$ is C$_1$-C$_4$ alkyl or hydroxyalkyl, the moiety —L—X, or two R$^3$ or one R$^2$ and R$^3$ together form the moiety —(CH$_2$)$_r$—A$^2$(CH$_2$)$_s$—, wherein A$^2$ is —O— or —CH$_2$—, r is 1 or 2, s is 1 or 2 and r+s is 3 or 4; R$^4$ is a substituted C$_3$-C$_{12}$ alkyl, hydroxyalkyl, alkenyl, aryl or alkaryl group having p substitution sites; R$^5$ is C$_1$-C$_{12}$ alkylene, hydroxyalkylene, alkenylene, arylene or alkarylene, or a C$_2$-C$_3$ oxyalkylene moiety having from 2 to about 20 oxyalkylene units provided that no O—O or O—N bonds are formed; $M^1$ is an $N^+$ or N group; each $M^2$ is an $N^+$ or N group and at least one $M^2$ is an $N^+$ group; X is a nonionic group selected from the group consisting of H, $C_1$-$C_4$ alkyl or hydroxyalkyl ester or ether groups, and mixtures thereof; L is a hydrophilic chain which consists entirely of the moiety —$(CH_2CH_2O)_n$—; d is 1 when $M^1$ or $M^2$ is an $N^+$ group and is 0 when $M^1$ or $M^2$ is an N group; for said cationic diamines, n is at least about 6; for said cationic polyamines, n is at least about 3; p is from 3 to 8; q is 1 or 0, t is 1 or 0, provided that t is 1 when q is 1.

2. A compound according to claim 1 wherein $R^1$ is $C_2$-$C_6$ alkylene.

3. A compound according to claim 2 wherein $R^1$ is hexamethylene.

4. A compound according to claim 2 wherein each $R^2$ is $C_1$-$C_4$ alkyl or hydroxyalkyl and each $R^3$ is methyl or the moiety —L—X.

5. A compound according to claim 4 wherein X is H.

6. A compound according to claim 5 which is an ethoxylated cationic diamine and wherein $R^2$ is methyl.

7. A compound according to claim 6 wherein $M^1$ and each $M^2$ are an $N^+$ group.

8. A compound according to claim 7 wherein n is at least about 12.

9. A compound according to claim 1 which is an ethoxylated cationic polyamine.

10. A compound according to claim 9 wherein $R^4$ is a substituted $C_3$-$C_6$ alkyl, hydroxyalkyl or aryl group; $A^1$ is

p is from 3 to 6.

11. A compound according to claim 10 wherein each $M^2$ is an $N^+$ group.

12. A compound according to claim 11 wherein n is at least about 12.

* * * * *

UNITED STATES PATENT AND TRADEMARK OFFICE
CERTIFICATE OF CORRECTION

PATENT NO. : 4,659,802
DATED : April 21, 1987
INVENTOR(S) : Donn N. Rubingh and Eugene P. Gosselink It is certified that error appears in the above-identified patent and that said Letters Patent is hereby corrected as shown below:

Column 4, line 38, "Example 8c" should be --Example Bc--.
Column 5, line 32, "Hloderby" should be --Holderby--.
Column 11, line 21, "86°C" should be --85°C--.

Signed and Sealed this

Sixth Day of June, 1989

Attest:

DONALD J. QUIGG

Attesting Officer

Commissioner of Patents and Trademarks